(No Model.)

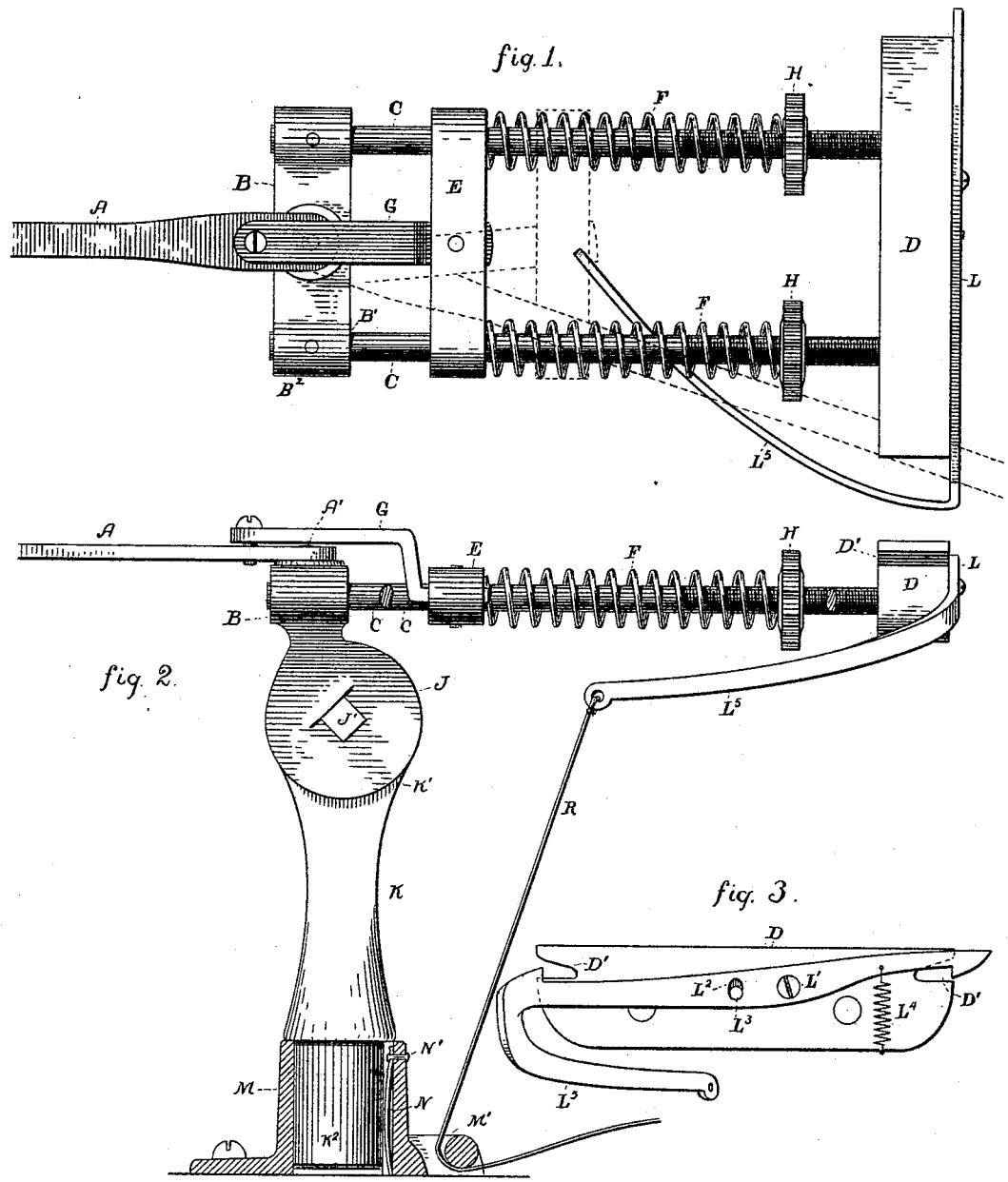

F. C. DAMM.
TARGET TRAP.

No. 328,569. Patented Oct. 20, 1885.

Witnesses:
H. H. Wells
A. Keithley

Inventor,
Fredrick C. Damm,
per A. B. Upham,
His Attorney

UNITED STATES PATENT OFFICE.

FREDRICK C. DAMM, OF PEORIA, ILLINOIS.

TARGET-TRAP.

SPECIFICATION forming part of Letters Patent No. 328,569, dated October 20, 1885.

Application filed March 23, 1885. Serial No. 159,867. (No model.)

*To all whom it may concern:*

Be it known that I, FREDRICK C. DAMM, of Peoria, in the county of Peoria and State of Illinois, have invented an Improved Trap; and I do hereby declare that the following is a full, clear, and exact description thereof, reference being had to the annexed drawings, making a part of this specification, and in which like letters of reference refer to like parts, and in which—

Figure 4:
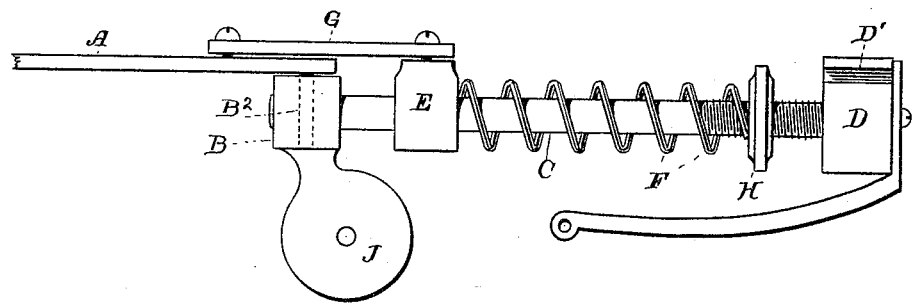
Figure 5:
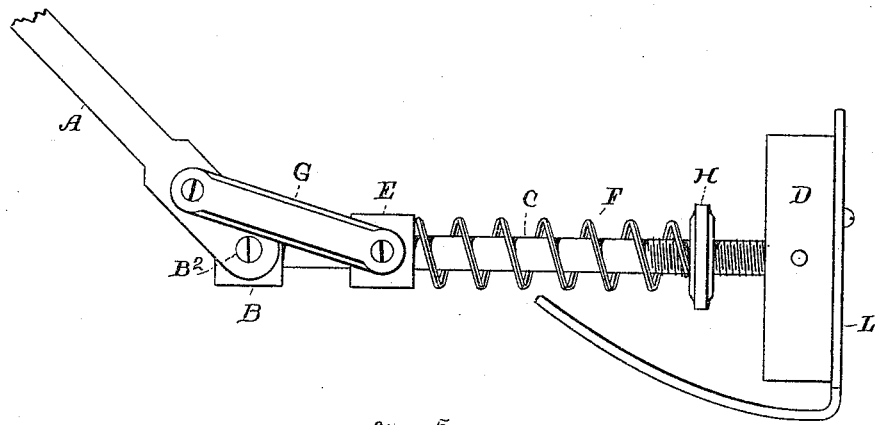

Figure 1 represents a plan view of the invention; Fig. 2, a side elevation of the same, and Fig. 3 an end view thereof; Fig. 4, a side view, and Fig. 5 a plan view, of a modified form of the trap.

The object of this invention is the construction of an improved trap or throwing mechanism for impelling into the air balls, flying-targets, and other objects for practice in marksmanship.

My trap is of that kind in which an approximately horizontally swinging pivoted arm is adapted to be oscillated by means of springs, and to be sprung by the pull of a cord passing therefrom to any desired point. Among other improvements which I desire to make is that of enabling the throwing-arm to be set in either lateral direction, so as to give a corresponding right or left handed throw.

In the drawings, A represents the throwing-arm, pivoted at one end to the center A' of the cross-head B. From the extremities B' of said cross-head B rigidly extend the cylindrical rods C to the weight-bar D, and mounted loosely upon said rods is the union-collar E, transversely apertured at each end to receive said rods. A coiled spring, F, upon each of the rods C abuts against said union-collar E, and impels the same toward the cross-head B. The link G, pivoted to the union-collar and to the throwing-arm A, imparts the rectilinear movement of said collar to the throwing-arm in an oscillatory motion of the latter.

The rods C are usually kept in place in cylindrical orifices in the cross-head B by means of the pins or screws B². More or less, however, of the other extremities of said rods are screw-threaded, not only as a means of fastening the same into the weight-bar D, but especially to enable the longitudinal adjustment thereon of the corrugated nuts H, by which the tension of the coiled springs F is regulated.

To prevent strain upon the springs F when the trap is not in use, I have the said springs sufficiently short as to not be compressed when the arm A is set, and the corrugated nuts H are screwed back against the weight-bar D. Said nuts H are peripherally corrugated or roughened to enable them to be readily turned by hand.

In order that there shall be no binding of the union-collar E upon the rods C, I pivot the link to said collar in a slot at its center, as shown in Figs. 1 and 2. This causes the link G to be therefore given a double bend, as shown in Fig. 2. Not to obscure the connection to the collar E of said link in Fig. 2 of the drawings, I have broken away the center portion of the nearer rod C.

To support this trap the cross-head B is provided with the disk-lug J, with which is secured by the screw J' the disk-head K' of the standard K. By unloosening the screw J' the trap can be adjusted to any desired angle of vertical incline. The cylindrical lower end, K², of said standard rests in the socket M, within which, in a suitable groove thereof, is a bent plate-spring, N, kept in place by the rivet N', and by means of said spring said standard and the trap attached thereto are kept from too easy turning.

In each end of the weight-bar D is a horizontal notch, D', the object of which is to receive the throwing-arm A when set. The double latch L, pivoted at L' to said weight-bar, held from too much deflection by the slot L² and pin L³, and elastically kept in place by the coiled spring L⁴, is disconnected from the throwing-arm held thereby by its bent prolongation L⁵, from the end of which passes the trip-cord R. When said cord is pulled, one end of the latch rises, and the other end sinks down from contact with the throwing-arm A and releases the same. In the base of the socket M is an eye, M', through which passes the said trip-cord to whatever place desired.

In Fig. 1 of the drawings I show in dotted lines the position of the throwing-arm A when set, and the union-collar E and link G. Said arm is here indicated set to but one side; but it can in the same way be set in the other lateral direction. By means of the notches D', into which the throwing-arm A is set, said arm is prevented from vertical displacement and oscillation while being released. In addition to this the lip of said notch keeps the arm A from being in any way accidentally released until the latch L is deflected.

In small traps of this kind I design to pivot the arm A to the pin $B^2$ of one rod C, and dispense with the other rod and the other halves of the cross-head and collar, pivoting the link G to the collar E just over its rod C. For moderate-sized and large traps I find, however, the combination of two or more rods and springs coiled thereabout to be of great advantage. Among other reasons for this are these: The double rods form a firm and rigid frame-work for better impelling the missles thrown; the frame is as light as possible for ease in carrying, and the weight D for resisting the kick of the throw is located so far from the pivot of the arm as to best offer its moment of inertia to counter-balance said kick.

The use of two instead of but one spring enables a more uniform resilient effect to be secured, one spring alone requiring to be so much stronger, and therefore inclined to give a more sudden jerk to the impelled object when starting off the throwing-arm. It is also much easier to turn the adjusting-nuts H where each has abutting against it a spring of one-half the strength.

What I claim as my invention, and for which I desire Letters Patent, is as follows, to wit:

1. The combination, in a trap, of the cross-head, the throwing-arm pivoted to said cross-head, one or more rods projecting rigidly from said cross-head, a collar loosely mounted upon said rod or rods, a link connecting said collar and throwing-arm, and one or more coiled springs upon said rod or rods, adapted to press against said collar, substantially as and for the purpose set forth.

2. The combination, in a trap, of the cross-head, the throwing-arm pivoted to said cross-head, one or more rods projecting rigidly from said cross-head, the collar mounted loosely upon said rod or rods, the link for connecting said collar to said throwing-arm, the weight-bar fixed to the ends of said rod or rods opposite to said cross head, and the coiled springs mounted on said rod or rods, and adapted to press against said collar by means of a suitable stop on said rod or rods, substantially as and for the purpose specified.

3. The cross-head, the throwing-arm pivoted thereto, and the rods rigidly projecting from said cross-head, in combination with the union-collar loosely mounted upon said rods, the link joining said collar and arm, the coiled springs mounted upon said rods and abutting against said collar, and the nuts adapted to increase the resilience of said springs by turning upon screw-threads made on said rods, as and for the purposes specified.

4. The cross-head, the throwing-arm pivoted thereto, and the rods projecting rigidly from said cross-head, in combination with the union-collar loosely mounted upon said rods, the link joining said collar and arm, the coiled springs mounted upon said rods and abutting against said collar, the nuts adapted to turn upon said rods, the weight-bar fixed to the ends of said rods, and the latch for holding the throwing-arm, substantially as and for the purpose specified.

5. In a trap, the combination, with a throwing-arm and means for actuating the same, of a supporting frame-work for said arm, having a horizontal notch therein adapted to receive said arm and keep it from transverse play, and a latch for holding said arm in said notch, substantially as described, for the purpose set forth.

6. In a trap, the combination, with the throwing-arm and means for actuating the same, of a supporting frame-work for said arm having the notches D' therein, one at each side thereof, and the double latch L, pivoted at an intermediate point to said frame-work and provided with the catch-prongs at its ends, whereby said arm can be set to either side, substantially as set forth.

7. In a trap, the combination, with the throwing-arm and means for actuating the same, of the frame-work carrying said arm, and the double latch L, pivoted at an intermediate point to said frame-work, and having a catch-prong at each side of said pivotal point and in opposite vertical sides, and provided with the tripping-arm $L^5$, whereby the same movement of said latch can release said arm from either catch-prong.

8. The combination, with the throwing-arm, mechanism, substantially as set forth, for operating the same, and the weight-bar D, having the notch D' in each end, of the latch L, having a catch-prong at each end and pivoted to said weight-bar, the spring $L^4$, for engaging said latch with the throwing-arm, and means for tripping said latch, substantially as and for the purpose specified.

9. In combination with the trap-standard K and socket M thereof, the bent plate-spring N, secured within said socket and adapted to impress against said standard, substantially as and for the purpose set forth.

10. In a trap, the socket M, the standard K, adapted to be turned in said socket and having disk-head K', the cross-head B, having disk-lug J projecting from the under side thereof, and a screw or bolt, J', for rigidly binding said disk-head and disk-lug together, in combination with the throwing-arm A, pivoted to said cross-head, the rods C, rigidly projecting from said cross-head, the union-collar E, loosely mounted upon said rods, the link G, joining said collar and arm, the coiled springs F, mounted upon said rods, the nuts H, adapted to be turned on screw-threads upon said rods C, the weight-bar D, fast to the ends of said rods, and the latch L, for holding said arm when set, substantially as and for the purpose specified.

11. In a trap, the socket M, having eye M' and spring N, the standard K, fitting into said socket and having disk-head K', the cross-head B, having disk-lug J, projecting from the underside thereof, and the bolt J', for uniting said disks, in combination with the throwing-arm A, pivoted at one end to said cross-head, the rods C, rigidly projecting from said cross-head, the union-collar E, loosely mounted upon said rods, the link G, pivoted to both the said collar and to the said arm, the coiled springs F, mounted upon said rods, the nuts H, adapted to be turned on screw-threads upon said rods, the weight-bar D, having terminal notches D', the double latch L, pivoted to said weight-bar and having slot $L^2$ and prolongation $L^5$, the pin $L^2$, and spring $L^4$, and a cord, R, substantially as and for the purpose specified.

In testimony that I claim the foregoing as my invention I have hereunto set my hand this 16th day of March, 1885.

FREDRICK C. DAMM.

In presence of—
 A. B. UPHAM,
 A. KEITHLEY.